US010453311B2

(12) United States Patent
Hall

(10) Patent No.: US 10,453,311 B2
(45) Date of Patent: Oct. 22, 2019

(54) SYSTEMS AND METHODS FOR PROVIDING SECURE DATA FOR WAGERING FOR LIVE SPORTS EVENTS

(71) Applicant: SportsMEDIA Technology Corporation, Durham, NC (US)

(72) Inventor: Gerard J. Hall, Durham, NC (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 60 days.

(21) Appl. No.: 15/636,297

(22) Filed: Jun. 28, 2017

(65) Prior Publication Data

US 2018/0005492 A1  Jan. 4, 2018

Related U.S. Application Data

(60) Provisional application No. 62/356,166, filed on Jun. 29, 2016.

(51) Int. Cl.
| | |
|---|---|
| *G07F 17/32* | (2006.01) |
| *G06Q 50/34* | (2012.01) |
| *H04W 12/06* | (2009.01) |
| *H04W 12/08* | (2009.01) |
| *H04W 12/10* | (2009.01) |

(52) U.S. Cl.
CPC ........ *G07F 17/3288* (2013.01); *G06Q 50/34* (2013.01); *G07F 17/323* (2013.01); *G07F 17/3204* (2013.01); *G07F 17/3223* (2013.01); *G07F 17/3241* (2013.01); *G07F 17/3244* (2013.01); *G07F 17/3269* (2013.01); *H04W 12/06* (2013.01); *H04W 12/08* (2013.01); *H04W 12/10* (2013.01)

(58) Field of Classification Search
CPC ............... G07F 17/323; G07F 17/3241; G07F 17/3288; G06Q 50/34
See application file for complete search history.

(56) References Cited

U.S. PATENT DOCUMENTS

| | | | |
|---|---|---|---|
| 7,534,169 B2 | 5/2009 | Amaitis et al. | |
| 8,029,362 B2 | 10/2011 | Walker et al. | |
| 8,057,300 B2 * | 11/2011 | Corbo | G07F 17/32 463/25 |
| 8,734,231 B2 | 5/2014 | Shore et al. | |
| 9,138,638 B2 | 9/2015 | Bastawros | |
| 2007/0082740 A1 | 4/2007 | Stearns et al. | |

(Continued)

*Primary Examiner* — Chase E Leichliter
(74) *Attorney, Agent, or Firm* — Neo IP

(57) ABSTRACT

Systems and methods for live sporting event wagering with data security and integrity are disclosed. At least one input capture device and at least one user device are constructed and configured in network communication with at least one computing platform. The at least one input capture device is configured to transmit live input data relating to a live sporting event to the at least one computing platform in real time or near real time. The at least one computing platform is configured to aggregate and analyze the live input data, thereby creating analyzed data. The at least one computing platform is further configured to set odds for wagering in the live sporting event based on the analyzed data in real time or near real time. The at least one user device is configured to display the odds, receive bets, and transmit the bets to the at least one computing platform.

20 Claims, 4 Drawing Sheets

(56) References Cited

U.S. PATENT DOCUMENTS

| | | | |
|---|---|---|---|
| 2009/0149233 A1 | 6/2009 | Strause et al. | |
| 2010/0317420 A1* | 12/2010 | Hoffberg | G06Q 30/0207 463/1 |
| 2010/0321499 A1* | 12/2010 | Ortiz | H04N 7/18 348/157 |
| 2013/0090157 A1* | 4/2013 | Tharp | G07F 17/32 463/25 |
| 2013/0102372 A1* | 4/2013 | Lutnick | G07F 17/3293 463/13 |
| 2013/0157735 A1* | 6/2013 | Amaitis | G06Q 50/34 463/6 |
| 2014/0274264 A1 | 9/2014 | Fine et al. | |
| 2014/0274321 A1 | 9/2014 | Ulrich et al. | |
| 2015/0262456 A1* | 9/2015 | Shore | G07F 17/3288 463/25 |
| 2015/0287265 A1* | 10/2015 | Lyons | G07F 17/3244 463/25 |
| 2016/0358406 A1* | 12/2016 | Daly | G07F 17/32 |
| 2018/0204416 A1* | 7/2018 | Perea-OcHoa | A63F 1/00 |
| 2019/0108232 A1* | 4/2019 | Calcaterra | G06F 21/50 |

* cited by examiner

SYSTEMS AND METHODS FOR PROVIDING SECURE DATA FOR WAGERING FOR LIVE SPORTS EVENTS

CROSS-REFERENCES TO RELATED APPLICATIONS

The present invention is related to and claims priority from the following U.S. patent documents: this application claims priority from U.S. Provisional Patent Application No. 62/356,166, filed Jun. 29, 2016, which is incorporated herein by reference in its entirety.

BACKGROUND OF THE INVENTION

1. Field of the Invention

The present invention relates to systems and methods for generating and providing data for sports betting or wagering, and more particularly, for providing secure data from live sports events with applied analytics for use in sports betting or wagering during the live event.

2. Description of the Prior Art

Systems and methods for sports betting and management of sports data are well known in the prior art. Included in the prior art are synchronization of real-time sports betting line or odds data for sports books. Also included are audio video of live golf, or "in camera views", or historic audio and video, with wagering. Another area is in-play betting and methods or systems for randomized in-play betting (micro-betting). Yet another area is a secure server system for sports betting with a Kiosk.

Exemplary US Patent Documents relevant to the prior art include:

U.S. Pat. No. 8,057,300 for "Method and system for providing real time sports betting information" by Corbo, filed on Jan. 12, 2010 and issued on Nov. 15, 2015, describes a method and system for providing sports betting information, in real time, utilizing a standard Internet connection on a computer to display the odds from a plurality of sports books are provided. The system provides its users with a line seeker alert, a major line move alert, a bet tracker, and a fully customizable display.

U.S. Pat. No. 9,138,638 for "Golf game management and entertainment system integrating pre-game, in-game, and post-game content for enhanced golfing experience" by Bastawros, filed on Mar. 14, 2013 and issued on Sep. 22, 2013, describes golf game management integrating pre-game, in-game, and post-game activities for a golf game into a unified experience. A golf cart-mounted entertainment console includes video cameras, sensory devices worn by the players during the game, and locally-mounted data processing components for modeling collected data. A cart-mounted interface, web site, and mobile device application present game-related content that allows players to view and manipulate data before, during and after the game. Multiple data processing modules provide several functions built on data collected from playing a game of golf for players to enjoy an enhanced golf experience.

U.S. Pat. No. 8,734,231 for "Systems and methods for enabling remote device users to wager on micro events of games in a data network accessible gaming environment" by Shore, et al., filed on Jun. 15, 2011 and issued on May 27, 2014, describes a method and system for micro-betting. One or more micro-bets can be electronically placed with respect to one or more micro-events associated with an event during a round of micro-betting. One or more wages with respect to the micro-bet(s) can be managed and controlled during the round of micro-betting. The wager(s) can be managed and controlled remotely from electronically placing the micro-bet(s) during the round of micro-betting. Additionally, a portion of a profit can be automatically obtained with respect to the round of micro-bets in exchange for the aforementioned managing and controlling of the wager(s) with respect to the micro-bet(s) during the round of micro-betting.

US Publication No. 20100321499 for "Wireless transmission of sports venue-based data including video to hand held devices operating in a casino" by Ortiz, et al., filed on Sep. 1, 2010 and published on Dec. 23, 2010, describes venue-based data including video from cameras located at a sports venue can be provided to hand held devices operating in a casino. A casino patron hand held device enables the view sporting events provided to a hand held device from a server and placement of wagers. Venue-based data including video and statistics are received from server including inputs or visuals captured as video by at least one camera located within at least one sports venue. Venue-based data is processed at server for display on a display associated with at least one hand held device operating within a casino. Venue-based data is displayed on hand held devices, enabling casino patrons to view event video moving about the casino. Casino patrons can also gamble using said hand held device while viewing selected sporting events within the casino.

U.S. Pat. No. 8,029,362 for "Gaming device methods and apparatus employing audio/video programming outcome presentation" by Walker, et al., filed on Aug. 8, 2006 and issued on Oct. 4, 2011, describes in a first aspect, a method of operating a gaming device. The method includes the steps of (i) receiving audio/video content; (ii) associating a plurality of sets of outcome values with the audio/video content; (iii) determining a play session; (iv) determining which of the plurality of sets of outcome values to associate with the audio/video content for a duration of the play session, thereby determining an active set of outcome values; (v) determining a result of a game play during the session; (vi) selecting, based on the result, a value from the active set of outcome values; and (vii) outputting, as an indication of the result, the audio/video content and an indication of the selected value.

US Publication No. 20070082740 for "Sports gaming and entertainment network" by Stearns, et al., filed on Oct. 11, 2006 and published on Apr. 12, 2007, describes A sports gaming and entertainment system has a plurality of kiosks to allow customers to access legal sports gaming opportunities, obtain sports information, view different sporting events, and make sports related purchases. A secure server is coupled to the plurality of kiosks. The secure server sends selected information from an internet system to the plurality of kiosks to allow the plurality of kiosks to offer legal sports gaming opportunities, obtain sports information, view different sporting events, and make sports related purchases.

U.S. Pat. No. 7,534,169 for "System and method for wireless gaming system with user profiles" by Amaitis, et al., filed on Aug. 9, 2005 and issued on May 19, 2009, describes a gaming system. The gaming system allows users to access applications via gaming communication devices coupled to a communication network. At least a portion of the network may be wireless. The gaming applications include gambling, financial, entertainment service, and other types of transactions. The system may include a user location determination feature to prevent users from conducting transactions from unauthorized areas. The gaming system may incorporate a user profile feature according to which certain information regarding users of the system may be maintained. Such information can include, without limitation, information relating to preferences, finances, activities participated in by the users, and trends and habits of the users.

SUMMARY OF THE INVENTION

The present invention is directed to systems and methods for providing secure data from live sports event(s) with applied analytics for use in sports betting or wagering during the live sports event(s).

The systems and methods provide for real-time raw data acquired from a live sports event received by at least one server over at least one network, aggregation of inputs, application of statistics, visuals, graphics, scoring, environmental data, and combinations thereof to the raw data, analysis and applied analytics and rules engine(s) to the data for transforming the real-time raw data from the live sports event(s) for use with wagering or betting for or during the live sports event without misuse or misappropriation of any of the data during the live sports event.

These and other aspects of the present invention will become apparent to those skilled in the art after a reading of the following description of the preferred embodiment when considered with the drawings, as they support the claimed invention.

DETAILED DESCRIPTION

Figure 1:
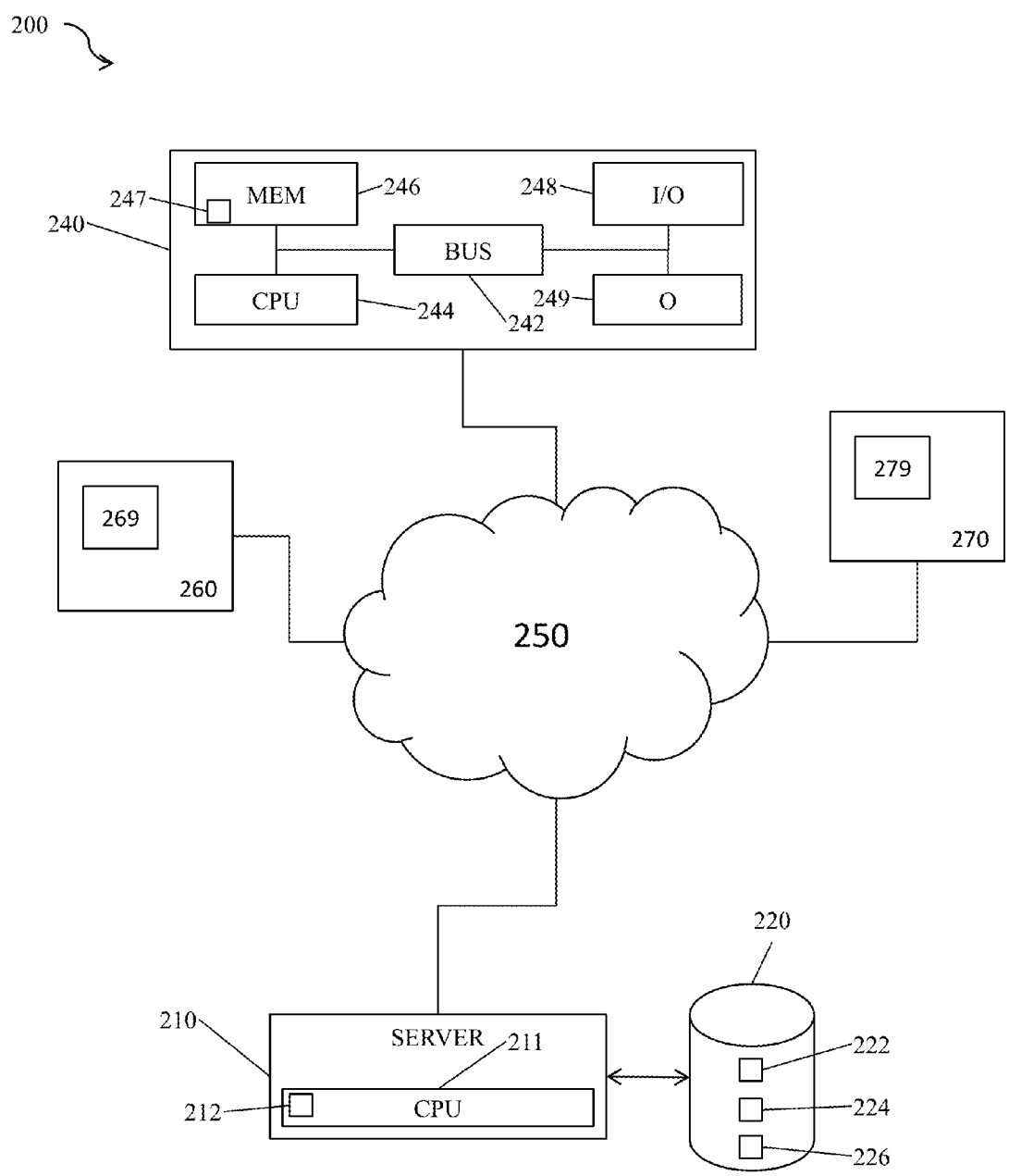
FIG. 1 is a schematic diagram illustrating a cloud-based system of the present invention.

The present invention provides systems and methods for providing secure data from live sports events with applied analytics for use in sports betting or wagering on the live sports event, particularly in-play betting and/or event-based and/or outcome betting. The IDS PGA Tour Scoring System Functional Specification 4.0 (Final) dated May 8, 2000; IDS PGA Tour Scoring System Download File Specification 1.0 dated Feb. 6, 2001; IDS PGA Tour Scoring Administration AcrView Integration Specification 1.0 dated Oct. 9, 2001; all published by Information & Display Systems of Jacksonville, Fla., USA are incorporated herein by reference in their entirety, including description and figures.

In one embodiment of the present invention, a computing platform including at least one server or at least one processor coupled with memory is operable to collect and aggregate various data in real time from at least one live sports event, and is operable to securely communicate data over at least one network for use in wagering or betting on the at least one live sports event for in-play or event betting or cross-event betting during the corresponding at least one live sports event via an interactive graphic user interface (GUI) on at least one computing device having a display and input/output mechanisms and operable for network-based communication with at least one server associated with the platform.

In one illustrative example, a live golf event is monitored with video and/or audio inputs received from a multiplicity of sensors, video cameras, and/or input capture devices that are constructed and configured to capture inputs for at least one aspect of the live golf event for at least one player, for providing live golf raw data of the live golf play in real time to the computing platform, wherein at least one of statistical information, graphics, scoring is applied to the live golf raw data, thereby transforming the live golf raw data into analyzed or transformed live golf data and transmitting the analyzed live golf data to a platform for use in generating markets or odds-making for use with wagering or betting, and providing a platform for offering and receiving bets for the at least one live golf event for in-play and/or event betting via an interactive GUI on at least one computing device having a display and input/output mechanisms during the corresponding live golf event, wherein the betting is based upon real time data or delayed data available for in-play betting.

In one embodiment, at least one sensor is provided on or associated with at least one golf player and is operable to track location data for the at least one player on the golf course during the live golf event. The at least one sensor communicates its data to a coordinator or to at least one server of the platform of the present invention. Preferably, the at least one sensor is a Global Positioning System (GPS) sensor.

By way of example and not limitation, inputs to the platform include: location data for the at least one golf player, at least one of location data, distance data, trajectory data, position and lie, for a golf ball for each shot and each hole for each round of golf corresponding to each of the at least one players, at least one of distance data and trajectory data for golf ball traveled with each hit, velocity data for each swing, a type of club or club selection a golf player uses, number of shot, scoring summary, hole location, course and/or hole conditions, weather conditions including temperature, wind conditions, humidity conditions, and precipitation conditions, stance, type of shot, and other real-time data available for receiving as input(s) by the platform during the live golf event. Optionally, a portable or wearable device associated with the at least one player is operable to transmit real-time data as inputs to the platform wirelessly over at least one communications network, such as location data, biometric data, etc., where permissible by applicable rules. In another embodiment, at least one video camera is operable to capture live video data for the at least one golf player during the live golf event and transmit the live video data over at least one communications network to the platform at least one server or to a cloud-based platform. By way of example and not limitation, a camera is operable to capture at least one swing and at least one shot for the at least one golf player, in 3D or 2D format, and transmit it to the platform wherein at least one of statistical information, visual graphics or illustrations, audio, scoring, etc., are applied for transforming the raw golf data inputs to the system into analyzed data for use in betting or wagering during the live golf event, including in-play or event based bets.

The platform is further operable to provide analytics to the live golf event data, for example to automatically compare, match, and/or apply at least one rule of golf to at least one golf situation requiring application of a rule for determination of a penalty or a relief during the live golf event for at least one player.

The analytics platform is operable to collect or receive information and perform analytics including at least one factor associated with real-time environmental data for the live golf event, for example but not limited to, wind, temperature, humidity, visibility, precipitation, etc., in combination with the live golf raw data received. In one embodiment, the information is measurements which are performed by a weather station on site at the live golf event, where the weather station includes a thermistor, a thermocouple, a RTD probe, a hygrometer, a barometer, a rain gauge, an anemometer, and combinations thereof.

The analytics platform is operable to access various statistical data. In one embodiment, the statistical data comprise historical performance data and scoring data for each golf player and each round in the previous games. By way of example and not limitation, statistical data includes how many strokes, the farthest stroke, and/or the average distance of strokes a specific player made in the past week, month, year, or any other time period. By way of example and not limitation, statistical data includes percentage of putts made, percentage of putts made from various distances, tendencies to make or to miss shots compared with a target, average and/or longest and/or shortest distance from the hole on approach shots from various yardage ranges during a certain period of time. Additional factors and/or attributes within the platform include player, tournament, match, matchplay, course, round, hole, pin location and description, course conditions, weather conditions, location, shot location, shot lie or location description, club, stance, stroke, shape of shot, distance, time of day, and/or day of week.

Additionally, the statistical data preferably includes vital data for the at least one golf player. The vital data includes at least one of: biometric data, personal factors or attributes, health data. Examples of biometric data include one or more of: hydration, heart rate, fatigue, blood pressure, body temperature, blood sugar level, blood composition, alertness, etc. Vital data also preferably includes personal and emotional factors that might affect or have previously affected the performance of a golf player, by way of example and not limitation, family matters within a certain period before or after the live golf event, such as a wedding, a funeral, birth of a child, etc.

The analytics platform is operable to perform intelligent analytics based on the real-time golf data, real-time environmental data, and statistical data, and provide in-depth understanding and predictive analytics for the at least one golf player's performance. The generated analytics data generated by the analytics platform can be used in different applications, for example but not limited to, broadcasting, training or coaching, fan enhancements, spectator engagement, interactive gaming, determining odds or markets for betting or wagering, and for use with in-play or live event based betting or wagering during the live golf event.

The present invention includes a golf betting platform, including a sportsbook, for receiving via interactive GUI inputs received over at least one communications network bets or wagers on at least one aspect of the at least one live golf event or any portion thereof. Sportsbooks include betting on, but are not limited to, golf, tennis, football, basketball, baseball, hockey, soccer, horse racing, boxing, and mixed martial arts. By contrast to traditional sportsbooks and the prior art, the present invention provides for systems and methods using a live sports wagering platform that includes security and ensures data integrity by providing a closed system including the live raw data, the analytics platform, and network-based communication therewith, wherein the real time raw data, statistics, analytics, bookmaking, and interactive graphical user interface (GUI) for offering and receiving bets from at least one user in a legal betting geographic area are integrated to provide a secure experience and to eliminate misuse or misappropriation of the live event raw data and any associated analytics. The closed system receives input for betting over secure communications network through secure interactive GUI(s) accessible only to authenticated user(s) in compliance with at least one rule automatically applied by the system to ensure legal and authorized activity, for example by a rules engine operable on the platform.

By way of example and not limitation, the foregoing is provided for a live golf event as the live sports event.

Data from the live sports event transmitted over the at least one network is provided with data completeness (i.e., no missing data elements), data timeliness (i.e., real time or near real time, such as by way of example less than about 10 seconds), data accuracy (comparison to original state before transmission or communication over the network), scoring accuracy for all holes, and groupings of multiple players for the round which are delivered within a predetermined time. The raw data obtained from one or more sensors or input sources in real time from the live golf event for the players is aggregated, and combined with at least one of visual graphic elements, statistics, scoring, analytics, either before transmission from the at least one server via the at least one network to at least one computing device having the interactive GUI for pre-betting functions and analytics, including but not limited to setting odds or market making, and/or for receiving bets or wagers for at least one factor or attribute for in-play and/or for the live golf event.

Also, preferably, global positioning system (GPS) or other location systems or geofencing systems are used to provide for security and rules application to prevent or preclude or delay any betting inputs on live sports events received from a computing device having the interactive GUI for placing bets active thereon, from operating within a predetermined distance of the live sports event. Additionally or alternatively, time-based coding or stamping of bets for in-play betting are provided automatically by the system, in particular for in-play betting. By way of example and not limitation, in-play betting options require additional rules application automatically to avoid any possibility of misappropriation or misuse of the live sports event data applied to wagering.

The rules engine of the platform provides for delay or lag in live event raw data release (i.e., not in real time or near real time) for security and compliance with rules for in-play betting, e.g., penalty shots on soccer goal, live golf events, etc. For example, live golf events provide for delay from real time or near real time broadcasting of live video feed or web-based posting of live video feed, as with commercially available live golf video provided with ShotLink technology offered by PGA Tour developed by Information & Display Systems and SportsMedia Technologies.

In one embodiment, the present invention includes a secure closed system of live sports event betting. The bets received include one or more of simple wagers, moneyline bets, spread betting, proposition bets, parlays, progressive parlays, teasers, if bets, run line (puck line or goal line), future wagers, head to head, totalizators, $2^{nd}$ half bets, in-play betting. In this embodiment, a bookmaker function operates as the intermediary between betters. The bookmaker function of the systems and methods accepts wagers, maintains a spread, and determines who has won and who has lost.

In the present invention, odds are set using statistics collected and/or generated from the platform, preferably within the closed system, and more preferably the odds are set after analytics apply the statistical information to the live event raw data. The odds are presented in formats including but not limited to at least one of decimal, fractional, and moneyline odds. In a closed system, the live sports events betting platform provides the bookmaker or sportsbook functionality.

Bets are registered with the system on or after being placed. For security purposes, bet registration may be delayed or rejected based upon the rules engine, for example, for certain types of betting, such as in-play betting and/or negative betting, such as missing a putt in a live golf event.

One embodiment of the present invention is a closed system including at least one server and at least one database operable for network-based communication with at least one computing device with an interactive GUI. By way of example and not limitation, the GUI can function on a tablet computer, a wireless computing device, mobile phone, smart phone, personal computer, laptop computer, or any machine having a display and a microprocessor coupled with memory and operable for network-based communication with the at least one server.

In one embodiment, the systems and methods include cloud-based computing or virtual computing systems. Although 'cloud computing' can generically be applied to any software as a service or to services interfacing through the Internet, in the present invention, 'cloud-based' computing refers to distributed computing among at least one server or more than one server over at least one communications network.

In one embodiment, the closed system in the present invention is a decentralized platform built with blockchain technology. The decentralized platform is operable to generate odds, record bets, validate betting results, and automate transactions. Smart contracts are deployed to execute betting processes automatically on the decentralized platform. The blockchain-based decentralized platform provides secure betting process and ensures data integrity in live sporting events. In another embodiment, the blockchain-based decentralized platform also provides cryptocurrency to facilitate betting transaction, rewarding, fee payment, and etc. Especially, micropayment enabled by the cryptocurrency makes transactions much more convenient for betting participants than traditional payments do.

The present invention is inextricably tied to computer-based technology. A platform in the present invention collects, processes and analyzes live data input from a live sporting event in real time or near real time, generate odds for betting, accepts bets from authorized users via network communication in real time or near real time, and determines a result for betting for the live sporting event. These steps in the present invention could not be performed before the internet or computer technology, nor can these steps be performed using only mental processes. Further, the present invention is a closed system for data collecting and analyzing, odds making and bookmaking with data security and integration provided by applying geofencing systems, GPS or other location systems, and rules engines for the live sporting event. None of those functions and/or features provided by the platform is not well-understood, routine or conventional.

Referring now to FIG. 1, a schematic diagram illustrating a cloud-based computing network used in of one embodiment of the invention for automated systems and methods is shown. As illustrated, components of the systems and methods include the following components and sub-components, all constructed and configured for network-based communication, and further including data processing and storage. As illustrated in FIG. 1, a basic schematic of some of the key components of a financial settlement system according to the present invention are shown. The system 200 comprises a server 210 with a processing unit 211. The server 210 is constructed, configured and coupled to enable communication over a network 250. The server provides for user interconnection with the server over the network using a personal computer (PC) 240 positioned remotely from the server, the personal computer having instructions 247. Furthermore, the system is operable for use with at least one or a multiplicity of remote computers, computing devices, or terminals 260, 270, having operating systems 269, 279 or software operable thereon. For example, a client/server architecture is shown. Alternatively, a user may interconnect through the network 250 using a user device such as a personal digital assistant (PDA), mobile communication device, or mobile computing device, such as by way of example and not limitation, a mobile phone, a cell phone, smart phone, tablet computer, laptop computer, wearable computing device, netbook, a terminal, or any other computing device suitable for network communication, whether wired or wireless. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices. The operating system may be any operating system known in the art that is suitable for network communication as described hereinbelow. Data storage 220 may house an operating system 222, memory 224, and programs 226.

Figure 2:
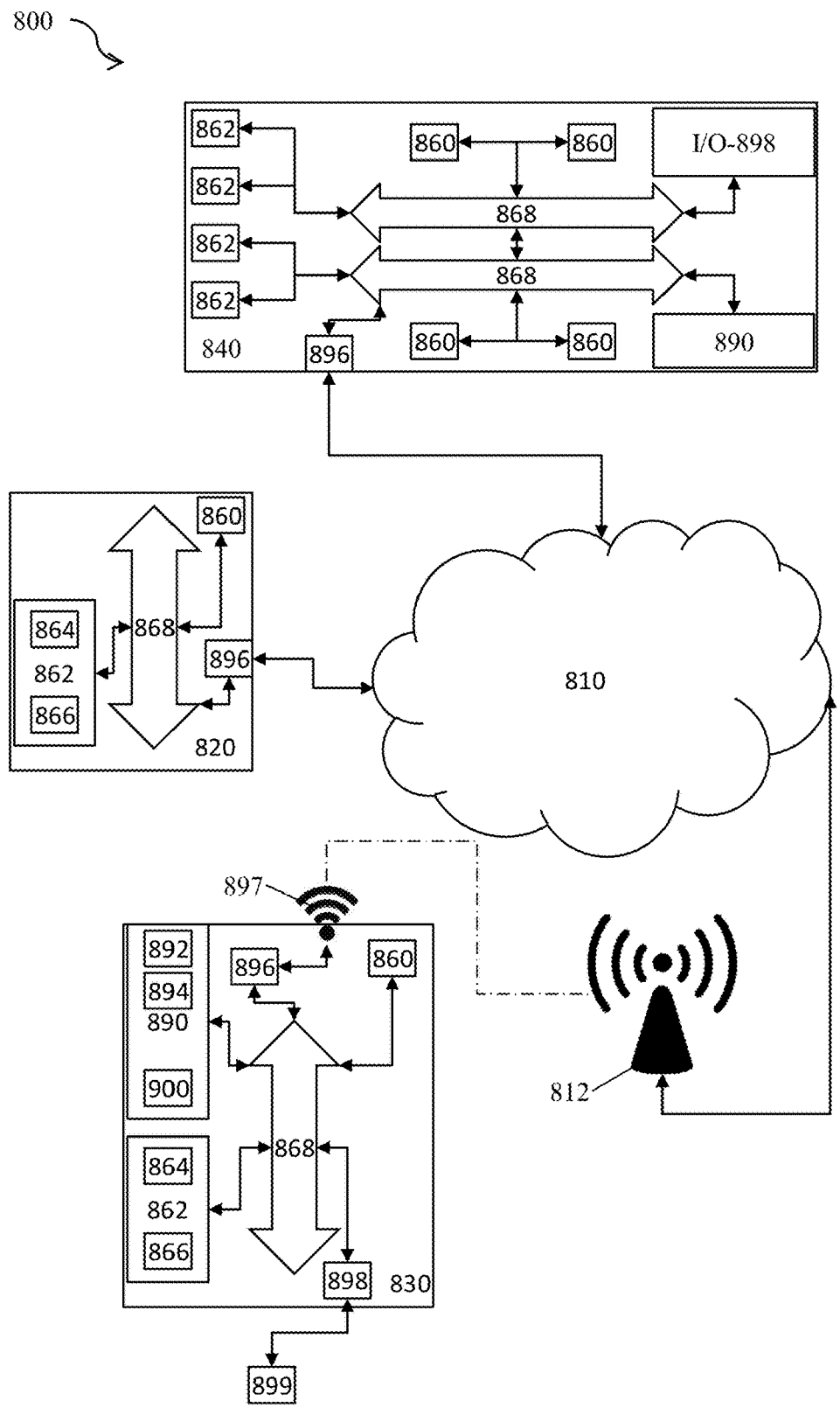
FIG. 2 is another schematic diagram illustrating a cloud-based system of the present invention.

Additionally or alternatively to FIG. 1, FIG. 2 is a schematic diagram of an embodiment of the invention illustrating a computer system and network, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized or cloud-based computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices.

The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 2, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core). Also, multiple computing devices may be connected via at least one network, with each device providing portions of the necessary operations (e.g., a server bank, a group of blade servers, or a multi-processor system). Alternatively, some steps or methods may be performed by circuitry that is specific to a given function.

According to various embodiments illustrated in FIG. 2, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium illustrated in FIG. 2 may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 illustrated in FIG. 2 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 2, may include other components that are not explicitly shown in FIG. 2, or may utilize an architecture completely different than that shown in FIG. 2. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

One or more communications protocols and/or methods for wired or wireless communications over the at least one network may be used with the present invention systems and methods.

The network-based communication can be wired or wireless using protocols such as, by way of example and not limitation, internet protocol (IP) including IPv4 and IPv6, cellular protocols 1G, 2G, 3G, 4G/LTE, and 5G, 802.11, Zigbee, Bluetooth, or others currently available or developed in the future. Also, by way of definition and description supporting the claimed subject matter, preferably, the present invention includes communication methodologies for messaging via a communication layer or for data transmission or communication over at least one network as described in the foregoing and in the following. IP-based communications over a network are most preferred for secure transmission, and for transmission of data having at least one of a security, a priority, a transport route, and content. Correspondingly, and consistent with the communication methodologies for transmitting or communicating data from the platform or at least one server, or within a closed system, as described hereinabove, according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMAX" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMAX, other communications protocols may be used, including but not limited to a "1G" wireless protocol such as analog wireless transmission, first generation standards based (IEEE, ITU or other recognized world communications standard), a "2G" standards based protocol such as "EDGE" or "CDMA 2000" also known as "1×RTT", a 3G based standard such as "High Speed Packet Access (HSPA) or Evolution for Data Only (EVDO), any accepted 4G standard such as IEEE, ITU standards that include WiMAX, Long Term Evolution "LTE" and its derivative standards, any Ethernet solution wireless or wired, or any proprietary wireless or power line carrier standards that communicate to a client device or any controllable device that sends and receives an IP-based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

Figure 3:
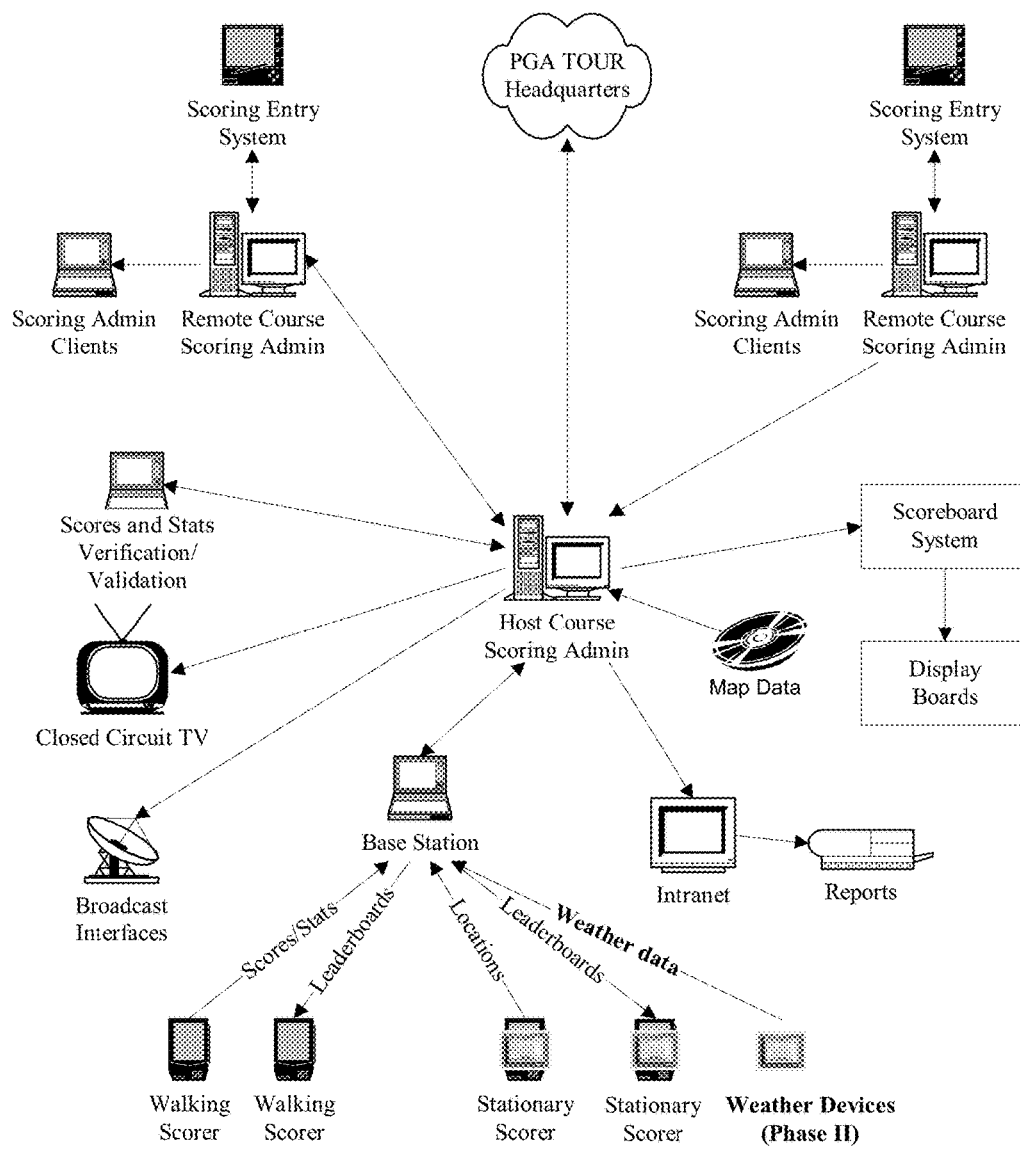
FIG. 3 is a schematic diagram illustrating select onsite system components for the live sports event.

FIG. 3 shows the connections between onsite system components in the context of a multi-course tournament. The components are preferably connected through network communication.

Figure 4:
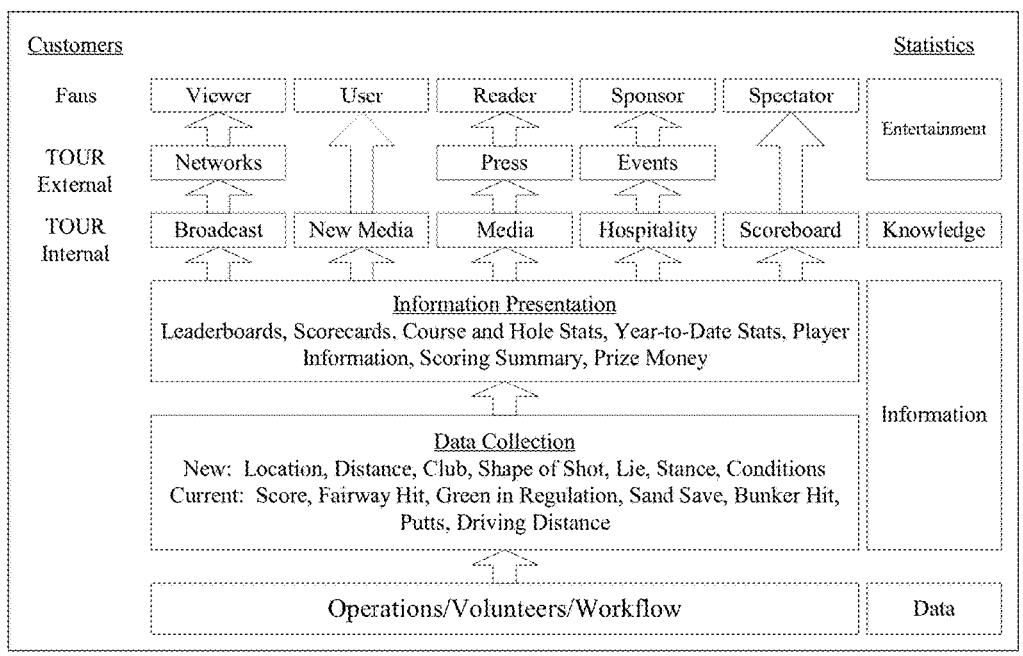
FIG. 4 is a flow diagram illustrating scoring system information flow.

FIG. 4 is a flow diagram illustrating scoring system information flow. FIG. 4 shows a flow diagram which illustrates the information flow for a scoring system. The system captures, presents, and/or analyzes score, location, distance, club, stance, lie, time stamp, shape of shot, weather conditions, and/or course conditions. Distance is captured alone or is derived from location information.

Certain modifications and improvements will occur to those skilled in the art upon a reading of the foregoing description. While live golf event is described in detail of this specification, the present invention may include any live sports event or events, by way of example and not limitation, golf, football, basketball, rugby, baseball, soccer, hockey, cricket, volleyball, tennis, horse racing, boxing, mixed martial arts, and any other sports event or competitive event(s). Also, the systems and methods of the present invention apply to professional sports events, amateur sports events, competitive events, unofficial or unsanctioned events or activities, individual competitive or in-play activities, online gaming events, etc. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for live sporting event wagering, comprising:
a multiplicity of input capture devices, a multiplicity of user devices, and at least one computing platform;
wherein the multiplicity of input capture devices and the multiplicity of user devices are constructed and configured in network communication with the at least one computing platform;
wherein the multiplicity of input capture devices comprises at least one camera, at least one location tracking sensor device, at least one biometric sensor device, and at least one weather sensor device;
wherein the multiplicity of input capture devices is configured to capture and transmit live input data relating to a live sporting event to the at least one computing platform in real time;
wherein the live input data comprises video data, location data, distance data, trajectory data, position data, movement data, speed data, velocity data, biometric data, and weather condition data;
wherein the at least one computing platform is configured to aggregate and analyze the live input data, thereby creating analyzed data;
wherein the at least one computing platform is configured to set odds for wagering in the live sporting event based on the analyzed data in real time;
wherein the multiplicity of user devices is configured to place bets on at least one aspect of the live sporting event via an interactive graphic user interface (GUI), wherein each bet comprises a timecode, and wherein the multiplicity of user devices is located beyond a predetermined distance of the live sporting event;
wherein the multiplicity of user devices is configured to transmit the bets to the at least one computing platform;
wherein the at least one computing platform is configured to determine at least one betting outcome relating to the live sporting event.

2. The system of claim 1, wherein the at least one computing platform is further configured to access statistical data relating to players in the live sporting event.

3. The system of claim 2, wherein the statistical data comprises historical performance data and scoring data for the players in previous games.

4. The system of claim 1, wherein the at least one computing platform is further configured to apply statistical information, graphics, and scoring to the live input data.

5. The system of claim 1, wherein the at least one computing platform is further configured to automatically compare, match, and apply at least one rule to at least one situation in the live sporting event.

6. The system of claim 1, further comprising a global positioning system (GPS) providing security and rules application for data from the multiplicity of input capture devices and the multiplicity of user devices.

7. The system of claim 1, further comprising a geofencing system providing security and rules application for data from the multiplicity of input capture devices and the multiplicity of user devices.

8. The system of claim 1, wherein the at least one computing platform comprises at least one rules engine for the live sporting event.

9. The system of claim 8, wherein the at least one computing platform is accessible only to authenticated users in compliance with at least one rule automatically applied by the at least one rules engine.

10. The system of claim 8, wherein the at least one rules engine is operable to provide delay or lag in releasing the live input data publicly.

11. The system of claim 1, wherein the bets are selected from the group consisting of simple wagers, moneyline bets, spread betting, proposition bets, parlays, progressive parlays, teasers, if bets, run line betting, future wagers, head to head betting, totalizators, $2^{nd}$ half bets, in-play betting.

12. The system of claim 1, wherein the odds are formatted as decimal odds, fractional odds, or moneyline odds.

13. The system of claim 1, wherein the at least one computing platform is cloud-based.

14. The system of claim 1, wherein the at least one computing platform is blockchain-based.

15. The system of claim 14, wherein smart contracts are deployed between the multiplicity of user devices and the at least one computing platform for the bets.

16. The system of claim 14, wherein transactions between the at least one computing platform regarding the wagering result are facilitated by cryptocurrencies.

17. The system of claim 1, wherein the at least one computing platform is configured to reject the bets.

18. A method for live sporting event wagering, comprising:
providing at least one input capture device and at least one user device constructed and configured in network communication with at least one computing platform, wherein the at least one input capture device comprises at least one camera, at least one location tracking sensor device, at least one biometric sensor device, and at least one weather sensor device, wherein the at least one user devices is located beyond a predetermined distance of the live sporting event;
the at least one input capture device transmitting live input data relating to a live sporting event to the at least one computing platform in real time, wherein the live input data comprises video data, location data, distance data, trajectory data, position data, movement data, speed data, velocity data, biometric data, and weather condition data;
the at least one computing platform aggregating and analyzing the live input data, thereby creating analyzed data;
the at least one computing platform setting odds for wagering in the live sporting event based on the analyzed data in real time;
the at least one user device placing at least one bet on at least one aspect of the live sporting event via an interactive graphic user interface (GUI), wherein the at least one bet comprises a timecode;
the at least one user device transmitting the at least one bet to the at least one computing platform; and
the at least one computing platform determining a wagering result for the live sporting event.

19. The method of claim 18, further comprising the at least one computing platform registering the at least one bet.

20. The method of claim 18, further comprising the at least one computing platform rejecting at least one registered bet based on at least one rules engine for the live sporting event.

* * * * *